(12) United States Patent
Wang et al.

(10) Patent No.: US 12,448,307 B2
(45) Date of Patent: Oct. 21, 2025

(54) REMOVAL OF SULFATE FROM SEAWATER (71) Applicant: Saudi Arabian Oil Company, Dhahran (SA)

(72) Inventors: Qiwei Wang, Dhahran (SA); Tao Chen, Dhahran (SA); Yasser A. Al-Jeshi, Al Qatif (SA); Nada Alghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 579 days.

(21) Appl. No.: 17/659,076

(22) Filed: Apr. 13, 2022

(65) Prior Publication Data

US 2023/0331598 A1    Oct. 19, 2023

(51) Int. Cl.
*E21B 43/20*    (2006.01)
*C02F 1/52*    (2023.01)
*C02F 101/10*    (2006.01)
*C02F 103/08*    (2006.01)

(52) U.S. Cl.
CPC .......... *C02F 1/5236* (2013.01); *C02F 1/5209* (2013.01); *E21B 43/20* (2013.01); *C02F 2101/101* (2013.01); *C02F 2103/08* (2013.01); *C02F 2209/19* (2013.01); *C02F 2303/22* (2013.01); *C02F 2305/00* (2013.01)

(58) Field of Classification Search
None
See application file for complete search history.

(56) References Cited

U.S. PATENT DOCUMENTS

| | | | |
|---|---|---|---|
| 3,613,788 A | * | 10/1971 | Kautsky .................. C02F 5/14 507/236 |
| 6,478,971 B1 | | 11/2002 | Koefod et al. |
| 6,886,406 B1 | | 5/2005 | Couet et al. |
| 7,144,511 B2 | | 12/2006 | Vuong |
| 7,985,318 B2 | | 7/2011 | Shevchenko et al. |
| 8,303,768 B2 | | 11/2012 | Shevchenko et al. |
| 9,085,477 B2 | | 7/2015 | Banerjee et al. |
| 9,266,754 B2 | | 2/2016 | Wahid |
| 9,612,204 B2 | | 4/2017 | Locklear et al. |
| 9,643,865 B2 | | 5/2017 | Matherly et al. |
| 10,501,680 B2 | | 12/2019 | Li et al. |
| 11,174,178 B2 | | 11/2021 | Hull et al. |

(Continued)

FOREIGN PATENT DOCUMENTS

| AU | 2009238632 | 10/2009 |
|---|---|---|
| TW | I241988 | 10/2005 |

(Continued)

OTHER PUBLICATIONS

U.S. Appl. No. 17/347,053, filed Jun. 14, 2021, AlGhunaimi et al.

(Continued)

*Primary Examiner* — Andrew Sue-Ako
(74) *Attorney, Agent, or Firm* — Fish & Richardson P.C.

(57) ABSTRACT

A method and system of providing seawater into a subterranean formation, including adding chloride salt having a metal cation to the seawater (having sulfate), precipitating sulfate salt (of the metal cation and sulfate), removing the sulfate salt as precipitated to give treated seawater having less sulfate than the seawater, and injecting the treated seawater into the subterranean formation.

24 Claims, 4 Drawing Sheets

(56) References Cited

U.S. PATENT DOCUMENTS

| | | | |
|---|---|---|---|
| 11,866,640 B2* | 1/2024 | Wang | C09K 8/54 |
| 2011/0163032 A1 | 7/2011 | Alexander et al. | |
| 2012/0118575 A1 | 5/2012 | Griffin | |
| 2012/0322699 A1 | 12/2012 | Karazincir et al. | |
| 2023/0313644 A1 | 10/2023 | Wang et al. | |

FOREIGN PATENT DOCUMENTS

| | | |
|---|---|---|
| WO | WO 2012109313 | 8/2012 |
| WO | WO 2013131183 | 9/2013 |
| WO | WO 2015013146 | 1/2015 |

OTHER PUBLICATIONS

Al Kalbani et al., "Impact of Relaxation of LSSW Parameters on Scaling Risk," SPE-200695-MS, presented at the SPE International Oilfield Scale Conference and Exhibition, Jun. 2020, 26 pages.

Al-Riyami et al., "When Will Low Sulphate Seawater No Longer Be Required on the Tiffany Field?" SPE International Symposium and Exhibition on Formation Damage Control held in Lafayette, Feb. 2008, 15 pages.

Al-Samhan et al., "Evaluating scale deposition and scale tendency of effluent water mix with seawater for compatible injection water," Journal of Petroleum Exploration and Production Technology, 2020, 10:2105-2111, 7 pages.

BinGhanim et al., "High Temperature Fracturing Fluid Based on Nanofiltrated Seawater," SPE-189048, presented at the SPE Kingdom of Saudi Arabia Annual Technical Symposium and Exhibition, Apr. 2017, 17 pages.

BinGhanim et al., "Scale Mitigation Strategy for Fracturing Using Seawater-Based Fluid," SPE-188029, presented at the SPE Kingdom of Saudi Arabia Annual Technical Symposium and Exhibition, Apr. 2017, 13 pages.

Collins et al., "Sulphate Removal for Barium Sulphate Scale Mitigation a Deepwater Subsea Production System," SPE-189048, presented at the SPE International Symposium on Oilfield Scale, May 2004, 11 pages.

Davis et al., "The Advancement of Sulfate Removal from Seawater in Offshore Waterflood Operations," Paper 02314, Corrosion 2002, NACE International, Apr. 2002, 13 pages.

Emmons et al., "On-Site, Near-Real-Time Monitoring of Scale Deposition," SPE 56776, presented at the SPE Annual Technical Conference and Exhibition, Oct. 1999, 6 pages.

Eseosa et al., "Prediction and Monitoring of Oilfield Carbonate Scales Using Scale Check," SPE 56776, presented at the Nigeria Annual International Conference and Exhibition, Jul.-Aug. 2011, 10 pages.

Heatherly et al., "Sulfate Removal Technology for Seawater Waterflood Injection," Offshore Technology Conference, May 1994, 18 pages.

Karadkar et al., "Elimination of Scaling Potential of Seawater in Downhole Environment through the Innovative Use of Nanofiltration and Scale Inhibitor," SPE Kingdom of Saudi Arabia Annual Technical Symposium and Exhibition, Apr. 2016, 13 pages.

Kirboga et al., "Effect of the experimental parameters on calcium carbonate precipitation," Chemical Engineering Transactions, Jun. 2013, 32:2119-2124, 7 pages.

Li et al., "A More Sustainable Approach: Nanofiltered Seawater-based High Temperature Fracturing Fluids," SPE-194708, presented at the SPE Middle East Oil and Gas Show and Conference, Mar. 2019, 14 pages.

Mackay et al., "Integrated Risk Analysis for Scale Management in Deepwater Developments," SPE Production & Facilities, May 2005, 20(02):138-154, 17 pages.

Mitchell et al., "Water Injection Methods," SPE 10028, International Petroleum Exhibition and Technical Symposium, Mar. 1982, 16 pages.

Monroe et al., "Gravel Packing High-Volume Water Supply Wells," Journal of Petroleum Technology, Dec. 1980, 32(12):2097-2102, 6 pages.

Moore et al., "Treatments to Improve the Performance of Injection, Disposal and Water Supply Wells," Journal of Petroleum Technology, Sep. 1959, 11(09):37-41, 5 pages.

Muresan et al., "Adsorption and surface-induced precipitation of poly(acrylic acid) on calcite revealed with atomic force microscopy," Colloids and Surfaces A: Physicochemical and Engineering Aspects, Oct. 2011, 390(1-3):225-230, 6 pages.

Muryanto et al., "Effects of malonic acid on calcium carbonate crystalline phases and morphology," Proceedings of the International Conference on Science and Technology: Atlantis Highlights in Engineering, Dec. 2018, 6 pages.

Nasr-El-Din et al., "Simulation of Injection Water Supply Wells in Central Arabia," Abu Dhabi International Petroleum Exhibition and Conference, Oct. 1996, 20 pages.

Nasr-El-Din, "New Mechanisms of Formation Damage: Lab Studies and Case Histories," SPE European Formation Damage Conference, May 2003, 12 pages.

Ostroff, "Injection Water Problems Identified By Laboratory Analysis," Middle East Technical Conference and Exhibition, Mar. 1981, 10 pages.

Pedenaud et al., "Industrial Experience in Sea Water Desulfation," SPE 10028, presented at the SPE International Conference and Exhibition on Oilfield Scale, May 2012, 8 pages.

Scott, "Pilot Testing of Membrane Technology to Selectively Remove Sulfate Ion From Seawater in the Wilmington Field," SPE 25152, presented at the SPE International Symposium on Oilfield Chemistry, Mar. 1993, 10 pages.

Seland et al., "Membrane Filtration of Seawater for Oil Reservoir Injection," SPE 24805, presented at the SPE Annual Technical Conference and Exhibition, Oct. 1992, 12 pages.

Shen et al., "Seawater injection, inhibitor transport and rock-brine interactions," SPE 114062, presented at the SPE International Oilfield Scale Conference, May 2008, 14 pages.

Vu et al., "Eliminating the Need for Scale Inhibition Treatments for Elf Exploration Angola's Girassol Field," SPE 60220, presented at the International Symposium on Oilfield Scale, Jan. 2000, 10 pages.

Wang et al., "CaCO3 scale prevention by additives in the presence of heavy metal ions," International Journal of Corrosion and Scale Inhibition, 2016, 5(1):12-30, 20 pages.

Wang et al., "Laboratory Study on Efficiency of Three Calcium Carbonate Scale Inhibitors in The Presence of EOR Chemicals," Petroleum, Dec. 2018, 4(4):375-384, 10 pages.

Xyla et al., "The inhibition of Calcium carbonate precipitation in Aqueous media by organophosphorus compounds," Journal of Colloid Interface and Science, Oct. 1992, 153(2):537-551, 15 pages.

Yang et al., "Investigation of Calcium Carbonate Scaling Inhibition and Scale Morphology by AFM," J Colloid Interface Sci., Aug. 2001, 240(2):608-621, 14 pages.

Zhang et al., "Investigation of scale inhibition mechanisms based on the effect of scale inhibitor on calcium carbonate crystal forms," Science in China Series B: Chemistry, Feb. 2007, 50(1):114-120, 7 pages.

* cited by examiner

REMOVAL OF SULFATE FROM SEAWATER

TECHNICAL FIELD

This disclosure relates to removal of sulfate from seawater for application of the seawater in oilfield applications.

BACKGROUND

Wells, such as a hydrocarbon well or water well, having a wellbore in a subterranean formation in the Earth crust may be treated. The treatments may be to facilitate production of hydrocarbon, such as crude oil or natural gas, from the subterranean formation. The treatments may involve the injection of water into a well. The injected water may be aquifer water, produced water (water produced along with and separated from hydrocarbon), or surface water (e.g., lake water, river water, seawater, etc.). The treatments can include secondary recovery and tertiary recovery, and other treatments (e.g., scale-inhibitor squeeze treatment).

Crude oil production may be separated into at least the three phases of primary, secondary, and tertiary. Primary oil recovery (for example, via pressure depletion) is generally limited to hydrocarbons that naturally rise to the surface or recovered via artificial lift devices such as pumps. Secondary oil recovery employs water injection (water flooding) and gas injection to displace oil to the surface. The water flooding in secondary recovery may generally not change the properties of the oil. The combination of primary recovery and secondary recovery can leave up to 75% of the oil in the well.

A way to further increase oil production is through tertiary recovery, also known as enhanced oil recovery (EOR). While waterflooding and gas injection during the secondary recovery may push the oil, EOR may apply chemicals (in water), polymers (in water), steam, or gas to change the makeup of the reservoir. EOR can generally entail changing the properties of the hydrocarbons, which further distinguishes this phase of recovery from secondary recovery. In implementations, EOR may restore formation pressure and enhances oil displacement in the reservoir. EOR or tertiary oil recovery increases the amount of crude oil or natural gas that can be extracted from a reservoir or geological formation. EOR or tertiary recovery can extract crude oil from an oil field that cannot be extracted otherwise. There are different EOR or tertiary techniques.

SUMMARY

An aspect relates to a method of providing seawater into a subterranean formation, including adding chloride salt having a metal cation to seawater (having sulfate) to give a mixture, precipitating sulfate salt (of the metal cation and sulfate) in the mixture, removing the sulfate salt as precipitated from the mixture to give treated seawater having less sulfate than the seawater, and injecting the treated seawater into the subterranean formation.

Another aspect relates to method of providing seawater into a subterranean formation, including adding salt of a metal cation and chloride anion to seawater having sulfate (sulfate anions), thereby precipitating a sulfate compound having the metal cation and sulfate anion. The method includes separating the sulfate compound as precipitated from the seawater to give treated seawater having a lower concentration of sulfate than the seawater, specifying a maximum concentration of sulfate in the treated seawater, and injecting the treated seawater into a subterranean formation.

Yet another aspect relates to a method of providing seawater into a subterranean formation, including adding salt having a metal cation to seawater having sulfate, thereby precipitating a sulfate salt of the metal cation and the sulfate. The method includes separating the sulfate salt from the seawater to give treated seawater having a sulfate concentration less than a sulfate concentration of the seawater. The method includes specifying a maximum value of the sulfate concentration of the treated seawater, and injecting the treated seawater into a subterranean formation.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Some aspects of the present disclosure are directed to removing sulfate from seawater so that significant formation of sulfate scale can be avoided in utilizing the seawater. To remove the sulfate, soluble salts (e.g., chloride salts) of cations such as barium, strontium, calcium, etc. are added to the seawater. These cations form salts (sulfate salts) with the sulfate anions in the seawater to precipitate the sulfate. The amount of sulfate precipitated (for removal) can be controlled by type and amount (and sequence) of the salts and their cations added. The formed precipitate may be removed from the seawater, such as by a gravity separator, centrifugal separator, filter, etc., to give treated seawater (the seawater minus the removed sulfate precipitate). The treated seawater may be utilized in oilfield applications, such as secondary recovery (e.g., water injection for pressure maintenance or to displace hydrocarbon to a production well), tertiary recovery or enhanced oil recovery (EOR) techniques (e.g., chemical flooding, $CO_2$ flooding, polymer water flooding, etc.), scale inhibitor squeeze, reservoir stimulation treatment (e.g., hydraulic fracturing, acidizing, etc.), and so on.

Seawater has been increasingly used in onshore oil and gas fields for scale inhibitor squeeze and reservoir stimulation treatments in order to conserve reservoir water and freshwater. Unfortunately, seawater typically contains high concentration of dissolved sulfate. Therefore, for hydrocarbon-bearing reservoirs (that receive the seawater) with high concentrations of divalent cations (such as calcium, strontium and barium) in their connate waters, the formation of the tenacious, plugging sulfate scales may a significant concern due to reactions between the divalent cations and sulfate. The sulfate ions in seawater should be reduced to prevent forming of sulfate salt scale that could damage the subterranean formation.

Membrane nanofiltration technology has been used to selectively remove sulfate from seawater. Drawbacks may be high capital expenditures (CAPEX) and operating expenses (OPEX). Another drawback may be that membrane nanofiltration typically generates relatively large quantity of rejected seawater. In addition, more than one pass at extra operating cost may be applied for certain seawater. Multi-pass treatment may be implemented to reduce sulfate concentration to low levels for seawater (e.g., Arabian Gulf seawater) having sulfate concentrations higher than typical seawater.

Embodiments herein may provide for a controlled precipitation technique by utilizing soluble salts (e.g., chloride salts) (e.g., of barium, strontium, or calcium) to remove sulfate in seawater. In implementations, the amount of sulfate removed can be controlled by type and amount of salts added. The salts can be added, for example, as solid powders or concentrated solution to the seawater. The precipitates formed may be removed, for example, by gravity sedimentation or gravity separation, medium filtration, centrifugal separator (centrifuge), or cyclone, and the like. Then, in implementations, the treated seawater can be employed with little or no concern of sulfate scale formation. Benefits compared to membrane nanofiltration may include improved (increased) efficiency of sulfate removal, lower sulfate levels in the treated seawater, lower treatment cost (both CAPEX and OPEX), and less wastewater generated. Implementations can be flexible and relatively straightforward to deploy.

Relatively large quantities of water may be utilized in oilfield applications, such as to enhance the hydrocarbon recovery. These operations may include water flooding, stimulation, scale inhibitor squeeze treatment, and so forth. As for a source of the water, seawater may be utilized in offshore fields, and in some onshore fields, e.g., where freshwater is limited or where there is motivation to conserve available freshwater.

Seawater may be characterized by high sulfate ($SO_4^{2-}$) concentration. In typical seawater in the world, sulfate may be, for example, about 2800 milligrams per liter (mg/L). For some seawater, such as in the Arabian Gulf, the sulfate concentration can be at least 4000 mg/L. When seawater is pumped into a subterranean formation, the seawater may mix with formation water having high hardness [e.g., calcium ($Ca^{2+}$), magnesium ($Mg^{2+}$), strontium ($Sr^{2+}$), barium ($Ba^{2+}$)], and therefore sulfate scales could form. The sulfate anion from the seawater and the cations from the formation water may react at certain temperatures and pressures causing different types of scale.

Scale build up is generally a concern in the oilfield industry. Scale formation can potentially plug the subterranean formation causing formation damage, thereby compromising hydrocarbon production.

Scale inhibitors, such as those commonly utilized in oilfield applications to prevent scale deposition, may become ineffective at high temperatures (e.g., greater than 275° F.) in water highly supersaturated (e.g., saturation ratio greater than 300) in scaling components (e.g., calcium carbonate, barium, sulfate, etc.) Also, some amount of the scale inhibitor applied may be lost to formation rock surface by adsorption, which can make the scale inhibitor treatment less effective.

In the Example below, laboratory tests (experiments) were performed that added different chloride salts (different in having different divalent cations) at various amounts to synthetic seawater to precipitate and remove sulfate from the synthetic seawater. Sulfate concentrations in the resulting synthetic seawater (after removal of the sulfate precipitate) were analyzed utilizing ion chromatography. These experiments verified that embodiments of the present techniques can be effective in sulfate removal from seawater.

As indicated, formation water in subterranean formations having hydrocarbon reservoirs (gas, oil, or oil and gas) may have relatively high concentrations of barium, strontium, and calcium. Thus, injection of seawater into the subterranean formation could cause sulfate scaling and render ineffective the associated treatment with the seawater and/or subsequent hydrocarbon production. Therefore, in those instances, sulfate ions in seawater should generally be removed before injection of the seawater into the subterranean formation. Embodiments herein may provide for a relatively straightforward and generally cost-effective technique to remove sulfate from seawater. The root-cause for sulfate scale formation may be their low solubility. Embodiments herein may take advantage of this low-solubility behavior for sulfate salt (scale) to remove sulfate ions in seawater by adding, for example, barium salt, strontium salt, or calcium salt to form the sulfate salt. Sulfate ions in seawater can be effectively removed. The removal efficiency can greater than with nanofiltration.

As mentioned, to prevent or reduce the formation of sulfate scales, seawater may be treated (pre-treated) via nanofiltration (NF) to remove most of the sulfate ions, producing low sulfate seawater (LSSW). To prevent barium sulfate ($BaSO_4$, barite) scale in offshore water flood with seawater, NF membrane technology has been used treat the seawater to remove sulfate. The conventional NF 1-pass sulfate reduction plant (SRP) configuration can reduce sulfate to about 50 mg/L (see Table 1). The NF 2-pass configuration can achieve as low as about 20 mg/L sulfate in NF-treated seawater from normal seawater. Table 1 gives example result of NF single-pass (1-pass) treatment of normal or typical seawater. The ions tabulated in Table 1 are sodium (Na), potassium (K), magnesium (Mg), calcium (Ca), chlorine (Cl), bicarbonate ($HCO_3$), and sulfate ($SO_4$). In addition to offshore water flooding, NF has also been suggested for treating seawater utilized in fracturing stimulation. Fracturing stimulation (hydraulic fracturing) can use millions of gallons per treatment for the horizontal drilling and multistage hydraulic fracturing the unconventional plays.

TABLE 1

| Typical seawater before and after NF treatment (1-pass) | | |
|---|---|---|
| (mg/L) | Feed SW | Product (after NF) |
| Na | 11150 | 9500 |
| K | 380 | — |
| Mg | 1350 | 560 |
| Ca | 410 | 270 |
| Cl | 18950 | 16313 |
| HCO3 | 148 | — |
| SO4 | 2850 | 51 |

NF can be a relatively expensive option. In addition to high CAPEX for the NF system equipment costs and installation, NF also has relatively high operation and maintenance costs. For addressing potential OPEX, care should be taken while designing the NF system and during operation of the NF system. The filtration may generally demand high supply pressure and relatively large amount of electricity supply. Further, the service life of the membrane can be limited. The membrane is typically replaced regularly. Moreover, pre-treatment of the seawater is implemented to remove suspended solids and to add chemicals, such as scale inhibitor and biocide. A periodic backflush is generally required to prevent membrane fouling. A relatively large quantity of water (e.g., about 25% to about 35% of the seawater) may be rejected, which can be an environmental pollution due to high concentrations of dissolved solids and added chemicals.

For seawaters with high sulfate concentrations, such as Arabian Gulf seawater, the sulfate in NF-treated water (permeate) remains high. Therefore, if reservoir (formation) water in the subterranean formation (that receives such NF-treated seawater) has high barium, barium sulfate scale may be expected to occur in the subterranean formation. Table 2 shows an example of Arabian Gulf seawater water before and after NF treatment.

TABLE 2

Arabian Gulf seawater before and after NF treatment (1-pass)

| (mg/L) | Feed SW | Product (after NF) |
|---|---|---|
| Na | 16682 | 16280 |
| K | 587 | 519 |
| Mg | 1849 | 255 |
| Ca | 603 | 213 |
| Sr | 12 | 2 |
| Cl | 29703 | 26400 |
| HCO3 | 126 | 103 |
| SO4 | 4300 | 297 |
| TDS | 54113 | 44088 |

As discussed, membrane NF technology has been used to remove sulfate ions from seawater and can have high CAPEX, and with high operating expenses (OPEX) related to energy consumption and membrane replacement. NF can also unfortunately generate large quantity of wastewater with high dissolved salts as rejected. In addition, for seawater (e.g., Arabian Gulf seawater) with higher sulfate than typical seawater, the sulfate concentration in treated seawater may remain too high after NF treatment to be utilized for reservoirs with significant barium concentration in formation waters.

Embodiments of the present techniques may provide for controlled precipitation of sulfate by adding soluble salts (e.g., of barium, strontium, or calcium), such as chloride salts, to remove dissolved sulfate in seawater, using the low-solubility property of the formed sulfate (e.g., barium sulfate, strontium sulfate, and calcium sulfate). The amount of sulfate removed can be controlled by type and amount of salts added. The precipitates may be removed, for example, by gravity sedimentation, medium filtration, a centrifugal separator, or a cyclone. Then, the treated water can be utilized (e.g., handled and injected) generally without significant sulfate scale formation. Advantageously, the removal reaction forming the sulfate salt and associated precipitation of the sulfate salt may be relatively fast. The sulfate concentration in the treated seawater can be controlled by salt type (and amount) utilized and reaction duration (time for sulfate salt to form and precipitate). In implementations, at least 99% of sulfate can be removed by the use of barium salt added to the seawater.

Table 3 lists two example compositions of the formation water of a high-temperature gas reservoir (temperature of about 350° F.) in the Middle East region, which has barium concentration greater than 4500 mg/L. For a mixture (of two waters) having 20 volume percent (vol %) of this reservoir water (Well #1 or Well #2) and 80 vol % LSSW by NF (in particular, the NF-treated seawater in Table 2), the mixture is about 100 times supersaturated to barium sulfate under the reservoir conditions of 350° F. and 4800 pounds per square inch gauge (psig). This supersaturation could be too high for scale inhibitor to be effective at high temperatures (e.g., 350° F.).

TABLE 3

High-temperature gas-reservoir water composition

| (mg/L) | Well #1 | Well #2 |
|---|---|---|
| Na | 62952 | 67836 |
| K | 2918 | 3127 |
| Mg | 1399 | 1484 |
| Ca | 25884 | 27611 |
| Sr | 2756 | 3371 |
| Ba | 4850 | 5852 |
| Cl | 161328 | 159192 |
| TDS | 251663 | 256235 |

With present embodiments, the sulfate concentration in feed seawater in Table 2 could be lowered, for example, to less than 75 mg/L. A mixture of 80 vol % of this treated seawater (having 75 mg/L sulfate) and 20 vol % of reservoir water (Well #1 or Well #2) of Table 3 would have a barium sulfate supersaturation less than 20.

Embodiments may remove sulfate utilizing (relying on) the chemical solubility behavior (low solubility) of sulfate salts and sulfate minerals. As examples, approximate solubility in water at 25° C. is about 0.26 mg/L for barium sulfate ($BaSO_4$), about 135 mg/L for strontium sulfate (celestite, $SrSO_4$), and about 2600 mg/L for anhydrite calcium sulfate ($CaSO_4$) and calcium sulfate as hydrate (e.g., gypsum or $CaSO_4 \cdot 2H_2O$). In comparison, approximate solubility in water at 25° C. for sodium chloride (NaCl) is about 360 grams per liter (g/L). A root cause for the formation of sulfate scales may be their low solubility. An approach relies on at least this property to remove dissolved sulfate ions in seawater by adding soluble salts (e.g., chloride salts).

Figure 1:
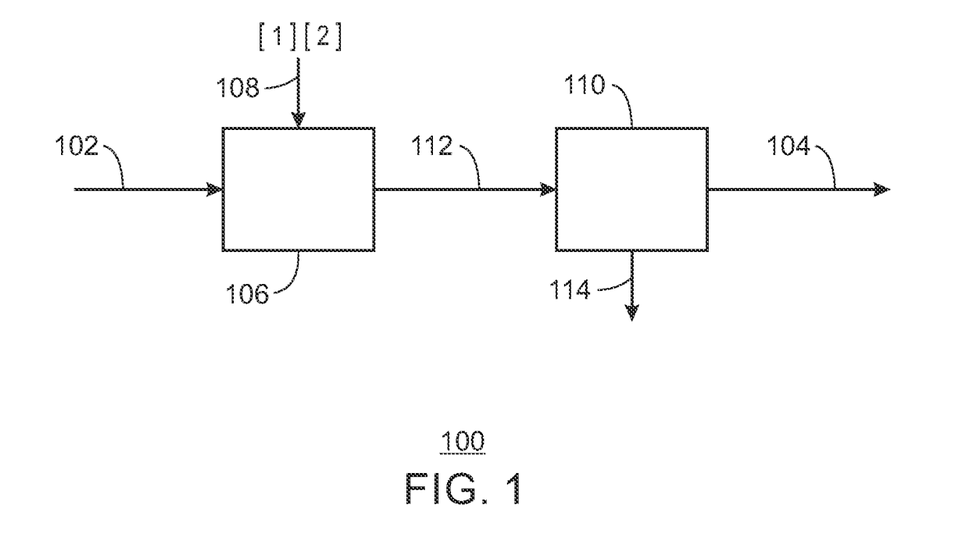
FIG. 1 is diagram of a seawater treatment system utilized in providing seawater into a subterranean formation.

FIG. 1 is a seawater treatment system 100 utilized in providing seawater into a subterranean formation. In operation, the system 100 receives seawater 102 to be treated and discharges treated seawater 104 for injection into a subterranean formation. The system 100 removes sulfate from the seawater 102 to give the treated seawater 104. The seawater 102 may have a sulfate concentration of at least 2000 mg/L, at least 2500 mg/L, at least 2800 mg/L, at least 3000 mg/L, or at least 3500 mg/L. The seawater 102 may have a sulfate concentration, for example, in the ranges of 2000 mg/L to 6000 mg/L, 2500 mg/L to 5750 mg/L, 3000 mg/L to 5500 mg/L, 3500 mg/L to 5250 mg/L, or 4000 mg/L to 6000 mg/L. The treated seawater 104 may have a sulfate concentration less than 1000 mg/L, less than 800 mg/L, less than 600 mg/L, less than 400 mg/L, less than 200 mg/L, less than 50 mg/L, or less than 20 mg/L. The treated seawater 104 may have a sulfate concentration, for example, in the ranges of 10 mg/L to 1000 mg/L, 5 mg/L to 500 mg/L, or 5 mg/L to 200 mg/L.

The seawater treatment system 100 may include a mixer vessel 106 and a separator vessel 110 operationally in series. The mixer vessel 106 may be operationally upstream of the separator vessel 110.

The system 100 includes the mixer vessel 106 to receive the seawater 102 to combine salt 108 with the seawater 102. The injected velocity of the salt 108 solution (or an injected blanket gas) may facilitate or promote mixing of the seawater 102 and the salt 108 in the vessel. The mixer vessel 106 may have an agitator (e.g., rotating mechanical agitator) or blender, or be a stirred-mixer vessel. The mixer vessel 102 may be or include a stirred mixer, rotating mixer, agitator, blender, etc. In operation, the mechanical agitator or other mixer of the mixer vessel 106 may mix the contents of the vessel 106. In implementations, the mixer vessel 106 may include an agitator that may be an impeller rotated via a shaft by a motor to mix contents of the vessel 106. In certain implementations, the mixer vessel 106 may be, for example, a vessel with an agitator (e.g., mechanical agitator driven by an electric motor). The mechanical agitator may include an impeller, such as a propeller, blade turbine, or ribbon blender, and so forth. The mixer as an impeller may include an axial flow impeller, a radial flow impeller, propeller, blades, turbine mixer, or ribbon blender (ribbon-shaped impeller), and the like. The impeller may be driven (rotated) by an electric motor. The impeller may be rotated via a shaft by the electric motor. In some examples, the mixer vessel 106 may have a baffle(s) to promote mixing. Other mixing elements or configurations are applicable.

In operation, the mixer vessel 106 receives the seawater 102 to be treated. A salt 108 (e.g., chloride salt) is added to the mixer vessel 106 to be mixed with the seawater 102 to precipitate sulfate in the seawater 102. The process in the mixer vessel 106 may be a batch process in that time (time-period) (batch time) is given for the sulfate precipitate to form before the contents 112 (seawater having sulfate precipitate) of the mixer vessel 106 is discharged from the mixer vessel 106. The separator vessel 110 downstream of the mixer vessel 106 may receive the batch-discharged contents 112 of the mixer vessel 106.

The mixer vessel 106 may have a seawater inlet (e.g., vessel nozzle) to receive the seawater 102. The seawater inlet of the mixer vessel 106 may be coupled to a seawater conduit conveying the seawater 102 to the mixer vessel 106. The mixer vessel 106 may have a salt inlet (e.g., vessel nozzle) to receive the salt 108. The salt inlet of the mixer vessel 106 may be coupled to a salt supply conduit conveying the salt 108 to the mixer vessel 106. The salt 108 may be added (e.g., through the salt supply conduit) as a solid powder or as an aqueous solution concentrated in the salt 108, and the like.

The salt 108 may have a metal cation and/or divalent cation to pair with sulfate anions in the seawater 102 to form and precipitate sulfate salt in the mixer vessel 106. The sulfate salt formed in the mixer vessel 106 may have the cations from the salt 108 and the sulfate anions from the seawater 102. The salt 108 added to precipitate the sulfate may be a chloride salt having a chloride anion. The salt 108 may include the metal or divalent cation (e.g., barium, strontium, calcium, etc.) and an anion such as chloride or other anion. The salt 108 may be, for example, barium chloride, strontium chloride, and/or calcium chloride, or their hydrates. The use of the terms barium chloride, strontium chloride, and/or calcium chloride may refer to their anhydride form and their hydrates.

The metal cation as barium, strontium, or calcium from the added salt 108 may pair with the sulfate in the seawater 102 in the mixer vessel 106 to give barium sulfate, strontium sulfate, or calcium sulfate, respectively. The barium sulfate, strontium sulfate, and/or calcium sulfate may precipitate in the mixer vessel 106 as solid precipitate. Again, an amount of time (e.g., as a batch time) may be specified for the precipitate to form in the mixer vessel 106. Also, the amount of salt 108 added may be specified to give a desired amount of precipitation of the sulfate salt (and thus give the maximum amount of sulfate ions remaining dissolved in the seawater).

The amount of sulfate precipitated (for removal) (the amount of the sulfate precipitate 114) can be controlled by amount and type (and sequence) of the salt(s) 108 (e.g., chloride salts(s)) including in particular their cations. See the Example below as examples.

As mentioned, the soluble salt 108 may be chloride salt. In implementations, the adding of the chloride salt to the mixer vessel 106 may include adding two different chloride salts (as salts 108 [1], 108 [2]) in sequence to the seawater 102, the two different salts including a first chloride salt (as salt 108 [1]) and a second chloride salt (as salt 108 [2]) added after the first chloride salt. The first chloride salt has a first metal cation (e.g., $Sr^{2+}$ or $Ca^{2+}$), and the second chloride salt has a second metal cation (e.g., $Ba^{2+}$) different from the first metal cation. More than two chloride salts may be added.

Depending for example on availability and cost, different salts 108 (e.g., different chloride salts) can be added in sequence. For example, calcium salt or strontium salt may be added as a first salt 108 [1] and then barium salt (e.g., which can be more expensive than calcium salt or strontium salt) added as a second salt 108 [2] in the sequence. In that example, calcium salt (e.g. calcium chloride) or strontium salt (e.g., strontium chloride) may be added as a first salt 108 [1] to precipitate a bulk (majority) of the sulfate from the seawater 102, and the barium salt (e.g., barium chloride) added as the second salt 108 [2] to precipitate most of the remaining sulfate in the seawater 102. Again, more than two salts 108 may be added. A first batch time (e.g., 1-5 hours) may be specified for sulfate salt to precipitate by the addition of the first salt 108 [1] to the mixer vessel 106. At the conclusion of the first batch time as specified, the second salt 108 [2] may be added to the mixer vessel 106. A second batch time (e.g., 1-5 hours) may be specified for sulfate salt to precipitate by the addition of the second salt 108 [1] to the mixer vessel 106. At the conclusion of the second batch time, the contents of the mixer vessel 106 may be discharged as discharged contents 112 to the separator vessel 110. In this scenario, the batch time for the mixer vessel 106 is the first batch time plus the second batch time.

The seawater treatment system 100 may include the separator vessel 110 disposed operationally downstream of (in series with) the mixer vessel 106. In operation, the separator vessel 110 may receive the discharged contents 112 of the mixer vessel 106 including the seawater and precipitated sulfate solids (sulfate salt) (e.g., barium sulfate, strontium sulfate, and/or calcium sulfate in solid form). The contents 112 (seawater and sulfate precipitate) of the mixer vessel 106 may be discharged from the mixer vessel 106 after expiration of the specified amount of time or batch time for the precipitate to form in the mixer vessel 106. The contents 112 of the mixer vessel may be discharged, for instance, every few hours (e.g., once per 2-24 hours) as a batch. The total batch time before discharge can be the batch time for the addition of a single salt 108 or a combination of respective batch times for the addition of multiple salts 108. In some implementations, pressure in the mixer vessel 106 may provide motive force for flow of the contents 112 of the mixer vessel 106 to the separator vessel 110. The mixer vessel 106 may have an outlet (e.g., nozzle) to discharge its contents 112 through a discharge conduit coupled to the outlet. The discharge conduit may convey the contents 112 to the separator vessel 110. The separator vessel 110 may have an inlet (e.g., nozzle) coupled to the discharge conduit to receive the contents 112. In implementations, a pump (e.g., centrifugal pump) may be disposed along the discharge conduit to provide motive force for flow of the contents 112 to the separator vessel 110 (and through the separator vessel 110 in some configurations).

In operation, the separator vessel 110 may remove (separate) the sulfate precipitate 114 (solid sulfate salt) (e.g., barium sulfate solid, strontium sulfate solid, and/or calcium sulfate solid) from the seawater to give the treated seawater 104. The treated seawater 104 may be the seawater 102 and any residual components (e.g., chloride ions, metal cations) of the salt 108 added minus the sulfate precipitate 114 removed. The treated seawater 104 (having less sulfate than the seawater 102) flows to a well for injection into a subterranean formation in the Earth crust. If certain implementations, a pump (e.g., centrifugal pump) may be disposed along the surface conduit conveying the treated seawater 104 to provide motive force for flow of the treated seawater 104 from the system 100 (e.g., from the separator vessel 110) through the surface conduit to the well.

The separator vessel 110 may be a filter, such as with the vessel as a filter housing having a filter element(s) (e.g., cartridge, membrane, etc.) disposed therein that filters the precipitate 114 from the seawater 102. The separator vessel 110 may be a bag filter. The separator vessel 110 can be a centrifugal separator or centrifuge (employing centrifuge separation) (e.g., solid bowl centrifuge, decanter centrifuge, and the like). The separator vessel 110 may be a cyclone separator, a hydrocyclone, etc. A flocculant or flocculating agent is generally not employed (not added to the separator vessel 110) for separation of the precipitate 114 from the seawater 102. In some implementations, the separator vessel 110 relies on gravity separation or gravity sedimentation. For instance, in some configurations, the precipitate 114 may settle to and discharge from a bottom portion of the vessel of the separator vessel 110.

For embodiments with the vessel 110 as a filter, the filter may generally be a vessel with filter elements disposed in the vessel. The vessel may be a filter housing with filters or filter elements disposed therein. The filter vessel has an inlet (e.g., inlet nozzle) to receive the contents 112. In some examples, the inlet is on a side portion or end portion of the filter vessel. In operation, the filter elements may collect solid material including the sulfate precipitate 114 from the contents 112. The vessel has a solids discharge outlet for the sulfate precipitate 114 (e.g., from the filter elements). In some examples, the solids discharge outlet is on a bottom portion or end portion of the filter vessel. The solids discharge outlet can instead be on a side portion of the vessel. The filter vessel has a filtrate outlet for the treated seawater 104 stream.

In certain implementations, the separator vessel 110 as a filter may be a candle filter, a metal mesh filter, a plate filter, or a spinning (rotating) disk filter, and the like. A candle filter may be a pressure filter operating on a batch cycle and with the pressure elements having a cylindrical shape. For a metal mesh filter, the filter element(s) may be a metal mesh. In certain examples of a rotating disk filter, the filter elements may be multiple adjacent disks in series. In operation, the contents 112 may flow across the disks and solid material collected and dislodged between the disks. The filtrate treated seawater 104 stream may discharge from the end of the series of disks. Certain examples of the plate filter may be a plate-and-frame filter press. These various filter types are given as examples. Other filter types are applicable as the separator vessel 110.

As indicated, in some embodiments, the separator vessel 110 may be a centrifuge, such as an industrial scale centrifuge. In implementations, the centrifuge can be electrically powered. In implementations, the centrifuge may be a continuous centrifuge although the centrifuge can be batch operated or operated intermittently (e.g., to coincide with batch discharges of contents 112 from the upstream mixer vessel 106). The centrifuge can be multiple batch or semi-batch centrifuges employed in parallel. A centrifuge may be a machine with a container that rotates in operation to apply centrifugal force to process contents of the container. In operation, a centrifuge may include a rapidly rotating vessel (container) that applies centrifugal force to the contents 112 to separate solids from liquid. In operation, the centrifuge may place the slurry in rotation around a fixed axis applying a force perpendicular to the axis of spin. The centrifuge can utilize sedimentation where the centrifugal acceleration causes denser substances and particles to move outward in the radial direction, and objects that are less dense are displaced and move to the center.

The separator vessel 110 (if a centrifuge) may be centrifuges of different rotor designs. The separator vessel 110 may be, for example, a continuous tubular centrifuge. The separator vessel 110 may be a filtration centrifuge or a sedimentation centrifuge. For the filtration centrifuge (also called screen centrifuge), a drum of the centrifuge is perforated and with a filter element (e.g., filter cloth, wire mesh, lot screen, etc.) inserted therein. In operation, the contents 112 may flows through the filter and the drum with the perforated wall from the inside to the outside. In this way, the solid material (sulfate salt 114) is restrained and can be discharged continuously or periodically. For a sedimentation centrifuge, the drum may be a solid wall (not perforated). The separator vessel 110 may be a pendulum centrifuge, separator centrifuge (e.g., solid bowl or conical plate), tubular centrifuge, decanter centrifuge, and so on.

The contents 112 from the mixer vessel 106 are processed in the separator vessel 110 (e.g., filter, centrifuge, cyclone, gravity separation vessel, etc.) and discharge as the treated seawater 104. In particular, the contents 112 flows through the separator vessel 110 that removes the sulfate salt precipitate 114. Thus the incoming contents 112 discharges from the separator vessel 110 as the treated seawater 104 having less sulfate than the provided seawater 102.

Figure 2:
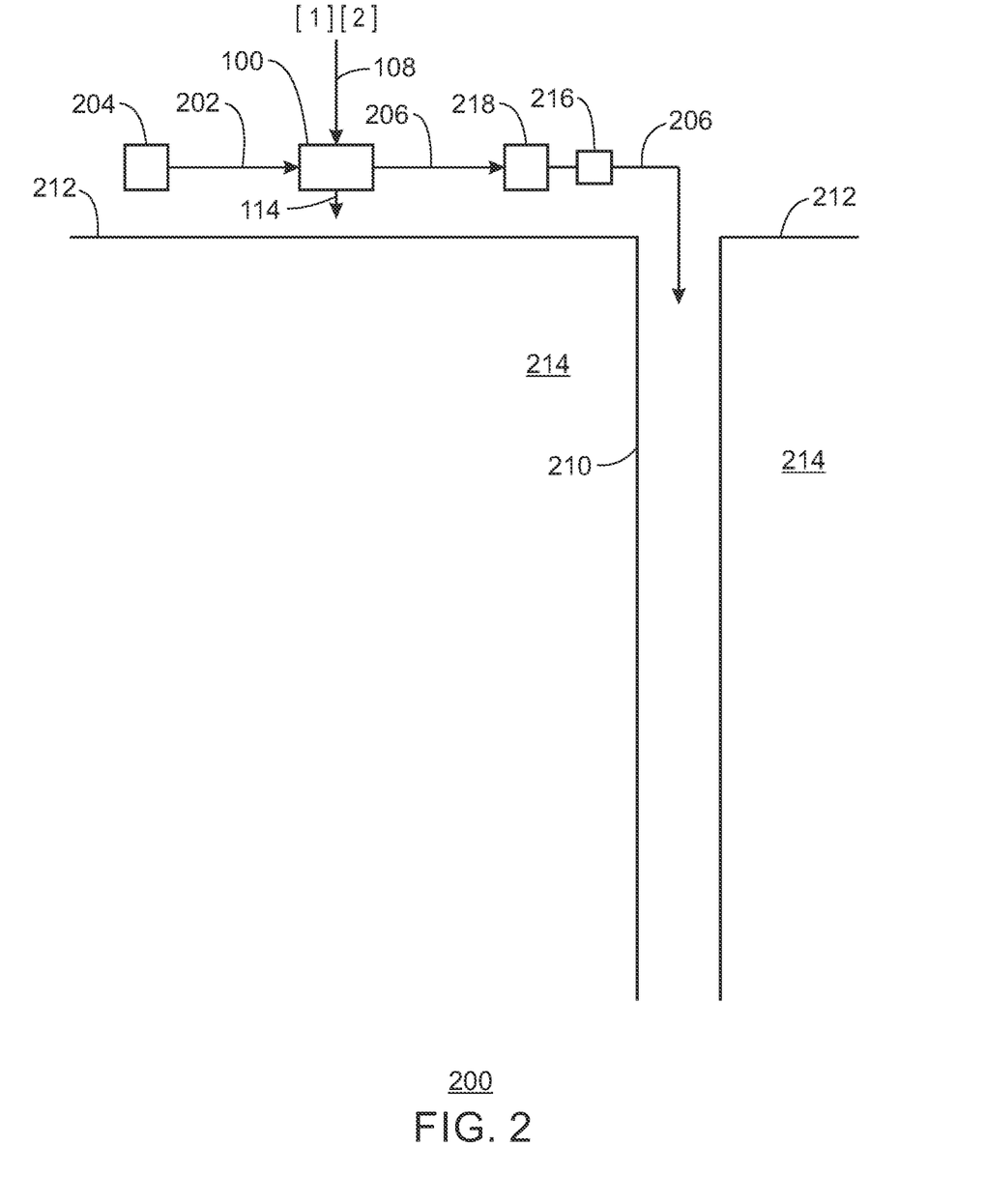
FIG. 2 is a diagram of a well.

FIG. 2 is a well 200. Seawater 202 may be provided for injection at the well 200. The seawater 202 may be provided from a source 204 (e.g., vessel) of the seawater 202. The seawater 202 may be conveyed via a surface conduit to the well 200. The surface conduit may be labeled as piping, pipe, or flowline. In implementations, the seawater 202 may be analogous to the seawater 102 of FIG. 1. The seawater 202 may have the same or similar sulfate concentration as the seawater 102 of FIG. 1. In implementations, the seawater 202 has a sulfate concentration of at least 2000 mg/L, or in the range of 2000 mg/L to 5500 mg/L.

The seawater 202 may be treated to remove sulfate, such as with the seawater treatment system 100 of FIG. 1. The seawater treatment system 100 (or similar treatment system) may be disposed at surface near or at the well site having the well 200. The surface conduit may convey the seawater 202 to the seawater treatment system 100. As discussed with respect to FIG. 1, a salt(s) 108 soluble in the seawater 202 may be added to the seawater 202. The salts(s) 108 may have a divalent or metal cation (e.g., $Ca^{2+}$, $Sr^{2+}$, $Ba^{2+}$, etc.). The salt(s) 108 may be, for example, a chloride salt in having chloride ($Cl^-$) as the anion of the salt 108. The salt(s) 108 may be added, for example, as a solid (e.g., powder) or concentrated in a water solution. The salt 108 may be added and then time given for the sulfate salt (e.g., $CaSO_4$, $SrSO_4$, and/or $BaSO_4$) to precipitate in the seawater 102. This sulfate precipitate 114 may be separated from the seawater 202 to give the treated seawater 206 having less sulfate than the entering seawater 202. As discussed with respect to FIG. 1, a single salt 108 (represented as salt 108 [1]) may be added or multiple salts 108 may be added respectively in series (e.g., a first salt 108 [1] and a second salt 108 [2]).

The well 200 includes a wellbore 210 formed through the Earth surface 212 into a subterranean formation 214 in Earth crust. The treated seawater 206 may be injected through the wellbore 210 into the subterranean formation 214 for secondary recovery (e.g., pressure maintenance or water flooding) or EOR (e.g., chemical flooding, polymer water flooding, etc.) While the treated seawater 206 may be injected for stimulation (e.g., hydraulic fracturing), EOR is defined herein as not including hydraulic fracturing.

The treated seawater 206 may be injected for other treatments, such as in a scale-inhibitor squeeze treatment of the well 200. The treated seawater 206 may convey scale inhibitor through the wellbore 210 into the subterranean formation 214. Subsequently, the treated seawater 206 may be utilized (injected through the wellbore into the formation 214) in a flush or over flush to push the scale inhibitor further into the formation 214 to interact with more formation rock for retention.

The subterranean formation 214 may have a hydrocarbon reservoir, such as an oil reservoir (including crude oil), gas reservoir (including natural gas), and/or oil and gas reservoir). Other hydrocarbons may be present in the subterranean formation 214. The well 200 may include a surface pump 216 (e.g., injection pump), such as a centrifugal pump or positive displacement pump, that pumps (injects) the treated seawater 206 through the wellbore 210 into the subterranean formation 214. The treated seawater 206 may be injected into the hydrocarbon reservoir in the formation 214. For cased portions of the wellbore 210, the injected seawater 206 may flow through perforations in the casing into the hydrocarbon reservoir in the subterranean formation 214. A "surface" pump (or other surface equipment) is a pump (or other equipment) disposed at the Earth surface 212.

In implementations, the well 200 may include a surface vessel 218 that receives the treated seawater 206 to be pumped (injected) by the surface pump 216. The seawater 206 (which may be labeled as injection water) may flow from the vessel 218 to the inlet (suction) of the surface pump 216. The vessel 218 may be, for example, a tank or container resting on the Earth surface 212 or on a vehicle (e.g., truck) at the surface 212, and the like. The injection well 200 may include a wellhead and other surface equipment.

As mentioned, the treated seawater 206 may be utilized in secondary recovery (e.g., water injection such as for pressure maintenance or water flooding) or EOR (e.g., chemical flooding, polymer flooding, $CO_2$ injection, etc.) In these various secondary recovery or tertiary recovery (EOR) techniques, the treated seawater 206 may be injected (pumped) (e.g., via surface pump 216) into the hydrocarbon reservoir (e.g., oil reservoir). The seawater 206 may be injected (pumped) (e.g., via the surface pump 216) into the hydrocarbon reservoir (e.g., oil reservoir) to maintain pressure (or facilitate pressure maintenance) of the oil reservoir. In the flooding, the treated seawater 206 may be injected (pumped) (e.g., via surface pump 216) into the hydrocarbon reservoir (e.g., oil reservoir) to displace hydrocarbon (e.g., crude oil in the hydrocarbon reservoir) through the subterranean formation 214 toward (and to) a production well. The displaced hydrocarbon (e.g., crude oil) may be produced to Earth surface via the production well (not shown). For chemical flooding, a chemical may be added to treated seawater 206 at surface 212. For polymer flooding, a polymer may be incorporated into the seawater 206 at surface 212. For $CO_2$ injection, the sweater 206 injection may be alternated with the $CO_2$ injection. Other types of flooding and EOR implementations are applicable.

Figure 3:
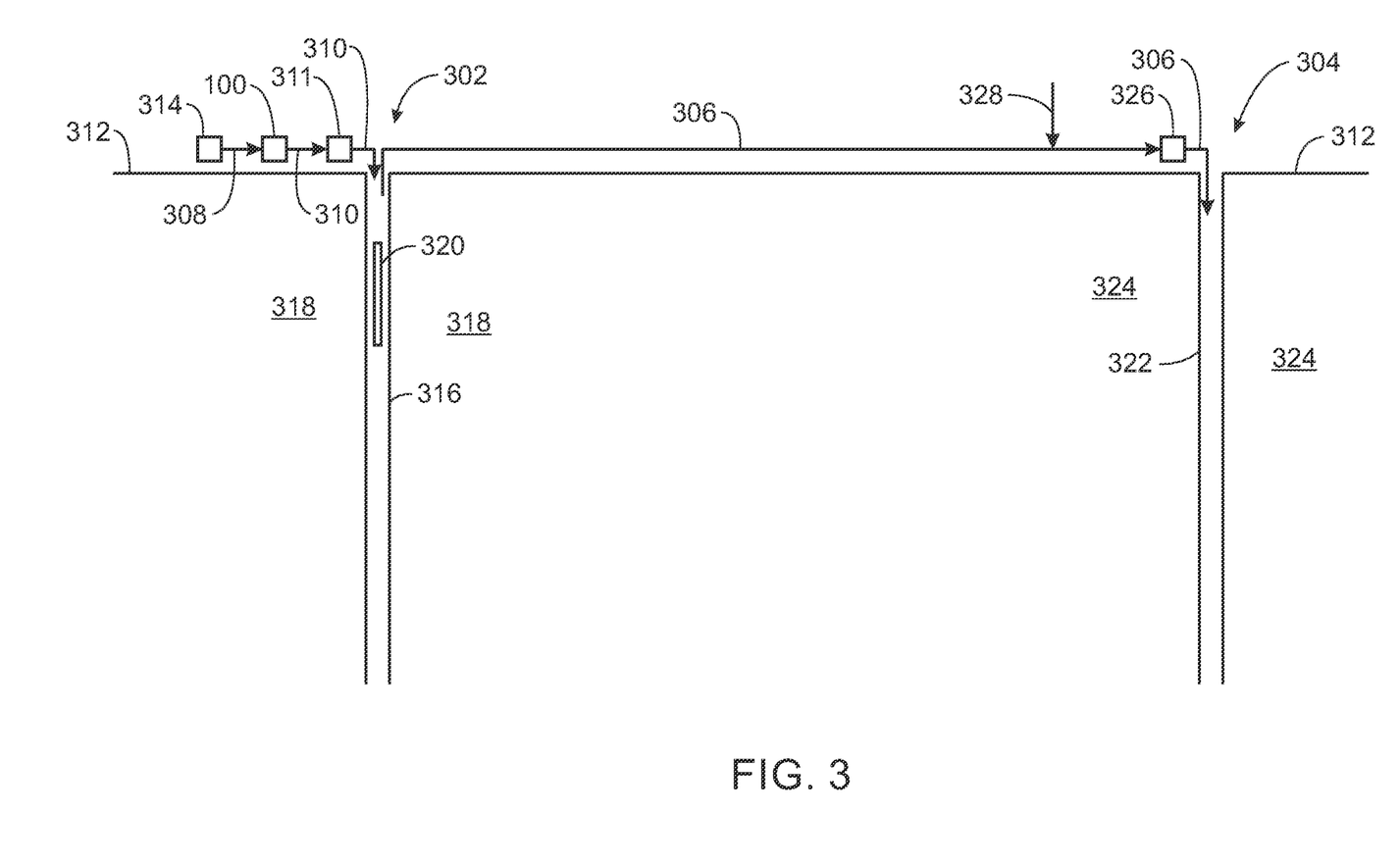
FIG. 3 is a diagram of a water supply well and an injection well.

FIG. 3 is a water supply well 302 (water well) and an injection well 304. The water supply well 302 may supply aquifer water 306 to the injection well 304 for injection. The water well 302 may be treated with scale inhibitor. Seawater may be utilized for a backside treatment of the water well 302 with scale inhibitor. Seawater may be utilized for a batch squeeze treatment of the water well 302 with scale inhibitor. The depicted seawater 308 may be provided for injection into the water well 302 for scale-inhibitor squeeze treatment of the water well 302 or scale-inhibitor backside treatment of the water well 302.

As for the supplied seawater 308, the seawater 308 may be treated (to remove sulfate) by the seawater treatment system 100 (see also FIGS. 1-2) to give treated seawater 310 having less sulfate than the supplied seawater 308. The treated seawater 310 is for the batch squeeze treatment (or backside treatment) of the water well 302 with scale inhibitor. The seawater 308 may be analogous to the seawater 102, 202 (FIGS. 1-2). The treated seawater 310 may be analogous to the treated seawater 112, 206 (FIGS. 1-2). A surface pump 311 may inject the treated seawater 310 into the water well 302 for the batch squeeze treatment or backside treatment. Scale inhibitor may be added to the treated seawater 310, for example, between the seawater treatment system 100 and the pump 311. In implementations, a vessel (not shown) may be disposed between the seawater treatment system 100 and the pump 311 to combine scale inhibitor with the treated seawater 310.

In the backside treatment, the scale inhibitor may generally be added to the treated seawater 310 that is injected so that the scale inhibitor is produced to surface 312 in the produced aquifer water 306. In the batch squeeze treatment, the scale inhibitor may generally be added to the treated seawater 310 for at least a portion of the batch squeeze treatment, such as for the initial batch application of the scale inhibitor to the well 302 to be retained. After the squeeze treatment, the scale inhibitor will release into the aquifer water 306 as produced at adequate concentrations for the treatment life (e.g., 6 months to 12 months). The scale inhibitor is produced to surface 312 in the produced aquifer water 306.

For treating the supplied seawater 308, the seawater treatment system 100 (see, e.g., FIGS. 1-2) (or similar treatment system) may be disposed at surface 312 near or at the well site having the water well 302. A surface conduit may convey the seawater 308 from a source 314 (e.g., vessel) of the seawater 308 to the seawater treatment system 100. As discussed with respect to FIGS. 1-2, a salt(s) soluble in the seawater 308 may be added to the seawater 308. The salts(s) added may have a divalent or metal cation (e.g., $Ca^{2+}$, $Sr^{2+}$, $Ba^{2+}$, etc.). The salt(s) added may be, for example, a chloride salt in having chloride ($Cl^-$) as the anion of the salt. The salt(s) may be added, for example, as a solid (e.g., powder) or concentrated in a water solution. The salt may be added and then time given for the sulfate salt (e.g., $CaSO_4$, $SrSO_4$, and/or $BaSO_4$) to precipitate in the seawater 308. This sulfate precipitate may be separated from the seawater 308 to give the treated seawater 310 having less sulfate than the entering seawater 308. As discussed with respect to FIG. 1, a single salt (e.g., chloride salt having a metal cation) may be added or multiple salts (e.g., chloride salts having different metal cations) may be added respectively in series.

The water supply well 302 includes a wellbore 316 formed through the Earth surface 312 into a subterranean formation 318 (in Earth crust) having an aquifer that may be known as an aquifer reservoir or water reservoir. The water supply well 302 may include an electrical submersible pump (ESP) 320 to provide (pump) water 306 from the aquifer to the surface 312. In particular, the water may flow from the aquifer (in the subterranean formation 318) into the wellbore 316 to the pump inlet (suction) of the ESP 320. For cased portions of the wellbore 316, the water may flow from the aquifer through perforations in the casing into the wellbore 316. In operation, the ESP 320 may pump and discharge the received water to the surface 312, such as for provision to the injection well 304 for injection. The water well 302 may include a wellhead and other surface equipment.

The injection well 304 includes a wellbore 322 formed through the Earth surface 312 into a subterranean formation 324 (in Earth crust) having an oil reservoir that includes crude oil. Natural gas and/or other hydrocarbons may be present in the subterranean formation 324. The injection well 304 may include a surface pump 326 (injection pump) (e.g., centrifugal pump or positive displacement pump) that pumps (injects) aquifer water 306 through the wellbore 322 into the oil reservoir in the subterranean formation 324. Again, the water 306 injected at the injection well 304 is generally the aquifer water 306 produced (supplied) from the water supply well 302 and that includes scale inhibitor (e.g., from a batch squeeze treatment of the water well 302). For cased portions of the wellbore 322, the injected water 306 may flow through perforations in the casing into the oil reservoir in the subterranean formation 324. The water 306 may be injected (pumped) into the oil reservoir to maintain pressure (or facilitate pressure maintenance) of the oil reservoir. The water 306 may be injected (pumped) into the oil reservoir (e.g., for water flooding) to displace crude oil in the oil reservoir through the subterranean formation 324 (e.g., toward a production well).

The water supply well 302 may deliver (produce) water 306, such as via ESP 320, to the surface 312. As discussed, water may flow from the aquifer (in the subterranean formation 318) into the wellbore 316 to the pump inlet of the ESP 320. The ESP 320 may pump and discharge the received water to the surface 312 as the aquifer water 306 (as source water for injection at the injection well 304).

The aquifer water 306 may be conveyed via a surface conduit to the injection well 304. The ESP 320 may provide motive force for the flow. In implementations, a surface pump(s) (e.g., a centrifugal pump as a booster pump) may pump the water 306 to provide additional motive force for flow through the surface conduit (piping). The aquifer water 306 having the scale inhibitor may flow through the surface conduit to the injection well 304. In some implementations, supplemental water 328 (e.g., produced water, surface water, treated seawater 310, etc.) may be added to the aquifer water 306 for injection.

As discussed, the surface pump 326 at the injection well 304 may pump (inject) the water 306. In implementations, a vessel (not shown), such as the vessel 218 of FIG. 2, may be disposed upstream of the surface pump 326 to receive the water 306 and provide the water 306 as injection water to the inlet (suction) of the pump 326.

As mentioned, for backside treatment, the scale inhibitor by being continuously injected (with treated seawater 310 as carrier fluid) down the backside of the water well 302 to be incorporated with the flowing aquifer water 306 being produced. In particular, as would be understood by one of ordinary skill in the art, the treated seawater 310 with scale inhibitor added therein may be injected from surface 312 into the wellbore 316 in the annulus between the wellbore casing (wellbore wall) and the production tubing (tubular) (that conveys the water from the wellbore) in the wellbore 316, and such that the scale inhibitor generally does not enter the aquifer in the formation 316. The scale inhibitor may enter with aquifer water into the ESP 320 inlet. The term backside may mean the backside of the tubular in the casing-tubing annulus.

As also mentioned, in other implementations, the water supply well 302 may be subjected to a batch squeeze treatment in which the treated seawater 310 with added scale inhibitor is pumped (injected) from the surface 312 through the wellbore 316 into the aquifer in the subterranean formation 318. In scale-inhibitor squeeze implementations, the scale inhibitor may be retained my reservoir (formation) rock in the aquifer and be gradually released during production of water from the aquifer via the water well 302. The treatment life of the batch squeeze treatment (if employed) may be, for example, in the range of 6 months to 12 months, in that the concentration of scale inhibitor in the water may generally be adequate to inhibit scale formation for that time.

Thus, a scale-inhibitor squeeze treatment may be applying pump pressure to force the scale inhibitor into the aquifer. A "batch" squeeze treatment may mean that the scale inhibitor is injected initially as a batch and not on going but intermittently for additional batches. The batch squeeze treatment may include: [1] providing (e.g., pumping) the treated seawater 310 with scale inhibitor through the wellbore 316 of the water supply well 302 into an aquifer in the subterranean formation 318; [2] pumping treated seawater (e.g., as an overflush and without scale inhibitor) through the wellbore 316 into the aquifer to displace the scale inhibitor (disposed by action [1]) further into the aquifer for interaction with more formation rock; and [3] shutting in the water supply well 302 (e.g., for 4 hours to 24 hours) for interaction of the scale inhibitor with formation rock (reservoir formation rock) in the aquifer (reservoir).

For application (injection) of the treated sweater 310 (with scale inhibitor) as a backside treatment or treated seawater 310 (with and without scale inhibitor) as batch squeeze treatment, the surface pump 310 (e.g., centrifugal pump or positive displacement pump) may pump the treated seawater 310 into the wellbore 316. The scale inhibitor (as applied) via the treated seawater 310 may thus be present in the produced aquifer water 306 to give injection water (having the scale inhibitor) for the injection well 304.

The scale inhibitor may be configured to inhibit formation of calcium carbonate ($CaCO_3$) scale and other scale. Scale inhibitor molecules, e.g., either phosphate based or polymer based, may be designed to form an arrangement with, for example, calcium ions ($Ca^{2+}$). In implementations, the scale inhibitor can also adsorb onto calcium salts (carbonate) to prevent or reduce growth of the salts (e.g., threshold effect). The scale inhibitor may be generally soluble in water. The scale inhibitor 104 may be, for example, an organic phosphate(s) or a polyacrylate-based polymeric compound(s). Examples of the organic phosphates include amino tri(m-ethylene phosphonic acid), bis(hexamethylene) triamine penta(methylene phosphonic acid), diethylenetriamine penta (methylene phosphonic acid), 2-phosphonobutane-1,2,4-tricarboxylic acid, and phosphate ester. Examples of the polyacrylate-based polymeric compound(s) include polyacrylate, polymaleic, polyvinyl sulfonate, polyacrylate/polymaleic copolymer, and maleic acid ter-polymer.

Figure 4:
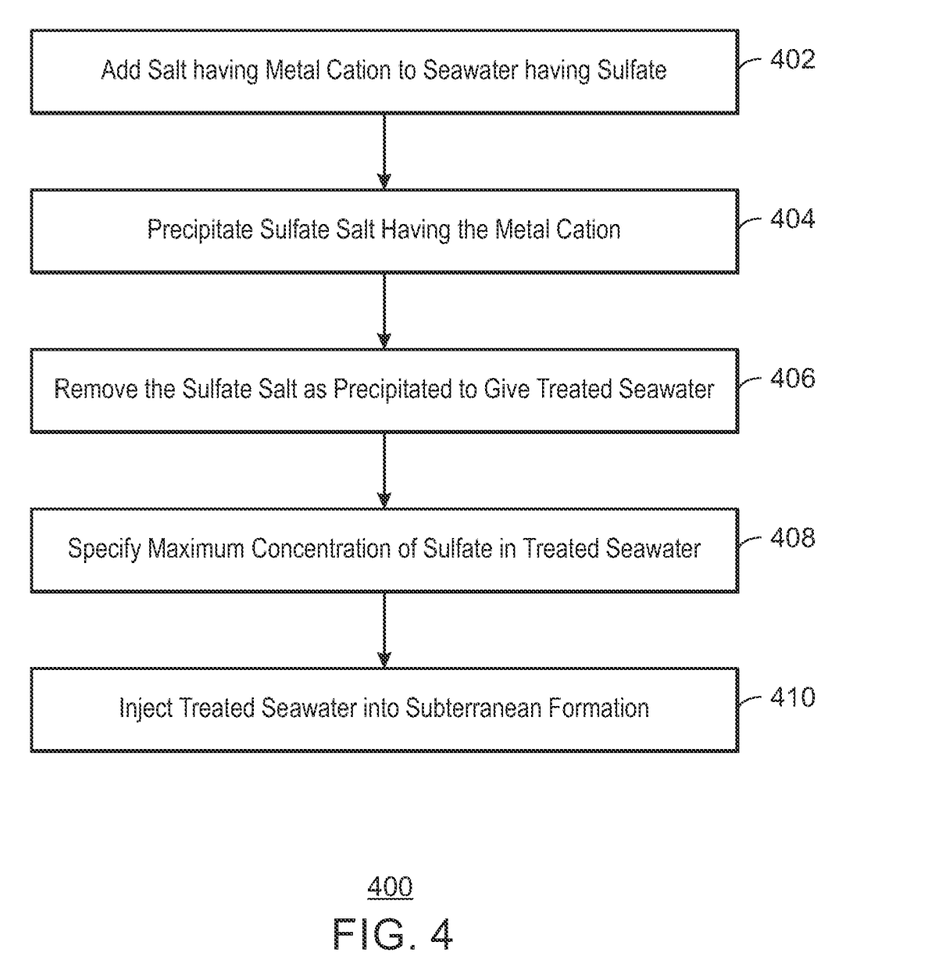
FIG. 4 is a block flow diagram of a method of providing seawater into a subterranean formation.

FIG. 4 is a method 400 of providing seawater into a subterranean formation. The method treats the seawater for application to the subterranean formation. The treating includes removing sulfate from the seawater to give treated seawater. Depending on the source of the seawater, the concentration of sulfate ($SO_4^{2-}$) in the seawater to be treated may be, for example, at least 2000 mg/L, at least 2500 mg/L, at least 2800 mg/L, or at least 3000 mg/L.

At block 402, the method includes adding chloride salt having a metal cation (e.g., barium, calcium, or strontium) to the seawater (having sulfate) to give a mixture. The chloride salt is generally soluble in seawater. The method may include adding soluble salt of a metal cation and chloride anion to the seawater having sulfate (sulfate anions), thereby precipitating (block 404) a sulfate compound (sulfate salt) including the metal cation and sulfate (sulfate anion). The metal cation may include, for example, barium ($Ba^{2+}$), calcium ($Ca^{2+}$), or strontium ($Sr^{2+}$), or any combinations thereof. The chloride salt may include, for example, barium chloride, calcium chloride, or strontium chloride, or any combinations thereof. While barium chloride as the chloride salt added may result in more sulfate salt precipitated (and thus less sulfate in the treated seawater) than if calcium chloride and/or strontium chloride are added, barium sulfate can be less available or more expensive than calcium chloride and strontium chloride in certain instances.

The adding of the chloride salt may include selecting the chloride salt for adding to the seawater in response to (based on, correlative with) the maximum concentration of sulfate in the treated seawater as specified (block 408). For example, barium chloride may be selected as the chloride salt added to meet (fall below) a specified maximum concentration of 100 mg/L in the treated seawater. In another example, calcium chloride and/or strontium chloride may be selected as the chloride salt added to meet (fall below) a specified maximum concentration of 1000 mg/L. Again, the incoming seawater may have at least 2000 mg/L of sulfate. The method may include specifying the salt added in response to the maximum value (block 408) of the sulfate concentration specified for the treated seawater, wherein the specified salt is added to the seawater, and wherein the resulting sulfate concentration of the treated seater is less than 1000 mg/L.

The adding of the chloride salt to the seawater may include specifying the salt added to the seawater in response to the specified maximum concentration of sulfate in the treated seawater, thereby maintaining concentration of sulfate in the treated seawater below the maximum concentration as specified. In this context, the method may include adjusting an amount of the salt added in response to the maximum concentration as specified for the treated seawater. In general, the method may include specifying an amount of the chloride salt added in response to the maximum concentration of sulfate specified (block 408) for the treated seawater.

In certain instances for a given chloride salt added to the seawater, an increased amount of the chloride salt added to the seawater may increase the amount of sulfate precipitate (solid sulfate salt) formed in the seawater and thus result in decreased sulfate in the treated seawater. A decreased amount of the chloride salt added to the seawater may decrease the amount of sulfate precipitate (solid sulfate salt) formed in the seawater and thus result in an increased amount of sulfate in the treated seawater. An increased amount of sulfate in the treated seawater may be acceptable, such as if below a specified maximum concentration. An advantage of adding less chloride salt may be to decrease cost of operation of treating (removing sulfate from) the seawater.

In implementations, the method may include adjusting an amount of the salt added to the seawater in response to the maximum value of the sulfate concentration specified for the treated seawater, wherein the salt is a chloride salt of the metal cation and chloride, and wherein the metal cation may include, for example, calcium ($Ca^{2+}$), strontium ($Sr^{2+}$), or barium ($Ba^{2+}$), or any combinations thereof. The method may include specifying the salt and an amount of the salt added in response to the maximum value of the sulfate concentration specified for the treated seawater, thereby maintaining concentration of sulfate in the treated seawater below the maximum value as specified.

The method may include in response to the maximum concentration as specified (block 408), changing the chloride salt added from a first chloride salt having a first metal cation to a second chloride salt having a second metal cation different from the first metal cation. This can occur, for example, due to changes in price or availability of chloride salts. In some instances, this can occur in response to a new or different (changed) specified maximum concentration of sulfate in the treated seawater. In one implementation with the specified maximum concentration changed to be lower, the first metal cation is calcium ($Ca^{2+}$) or strontium ($Sr^{2+}$), or both, and the second metal cation is barium ($Ba^{2+}$).

Again, the salt added may be, for example, barium chloride, calcium chloride, or strontium chloride. In particular implementations, the adding of the salt to the seawater includes adding a first salt and a second salt after the first salt, wherein the metal cation of the first salt includes calcium ($Ca^{2+}$) or strontium ($Sr^{2+}$), or both, and wherein the metal cation of the second salt includes barium ($Ba^{2+}$). In implementations, the adding of the chloride salt to the seawater includes adding two different chloride salts in sequence to the seawater, the two different salts including a first chloride salt and a second chloride salt added after the first chloride salt. The first chloride salt has a first metal cation [e.g., calcium (Ca2+) or strontium (Sr2+)], and the second chloride salt has a second metal cation [e.g., barium ($Ba^{2+}$)] different from the first metal cation. In implementations, the adding of the chloride salt includes adding a first chloride salt (including at a specified amount) for a first time period and adding a second chloride salt (including at a specified amount) for a second time period after the first time period, wherein the second chloride salt is different than the first chloride salt. In some implementations, the first chloride salt includes calcium chloride or strontium chloride, or both, and the second chloride salt includes barium chloride.

The salt (soluble in seawater) added to the seawater may be a first chloride salt and a second chloride salt different than the second salt, wherein adding the salt includes adding the first chloride salt for a first time period (e.g., first batch time) and adding the second chloride salt for a second time period (e.g., second batch time) distinct from and after the first time period. In this scenario, the metal cation of the first chloride salt may be calcium ($Ca^{2+}$) or strontium ($Sr^{2+}$), and the metal cation of the second chloride salt may be barium ($Ba^{2+}$).

At block 404, the method includes precipitating sulfate salt in the mixture. The sulfate salt includes the metal cation and sulfate. The sulfate salt may be, for example, barium sulfate, calcium sulfate, or strontium sulfate. The method may include adjusting an amount time for the sulfate compound to precipitate in response to the maximum concentration of sulfate as specified (block 408) for the treated seawater, thereby maintaining the concentration of sulfate in the treated seawater below the maximum concentration as specified.

At block 406, the method includes removing the sulfate salt as precipitated from the mixture to give the treated seawater having less sulfate than the seawater. The method may include separating the sulfate compound (e.g., sulfate salt) as precipitated from the seawater to give treated seawater having a lower concentration of sulfate than the seawater. The method includes separating the sulfate salt from the seawater to give treated seawater having a sulfate concentration less than a sulfate concentration of the seawater. The sulfate precipitated as the sulfate precipitate as a solid sulfate compound (sulfate salt) may be separated from the seawater, for example, by, medium filtration (a filter), centrifugal separator (a centrifuge), cyclone, or gravity sedimentation or gravity separation, and the like. The resulting treated seawater may have a sulfate concentration less than 1000 mg/L, less than 800 mg/L, less than 600 mg/L, less than 400 mg/L, less than 200 mg/L, less than 50 mg/L, or less than 20 mg/L. The treated seawater may have a sulfate concentration, for example, in the ranges of 10 mg/L to 1000 mg/L, 5 mg/L to 500 mg/L, or 5 mg/L to 200 mg/L.

At block 408, the method may include specifying a maximum concentration of sulfate in the treated seawater. Thus, the method includes specifying a maximum value of the sulfate concentration of the treated seawater. The maximum concentration of sulfate specified for the treated seawater may be, for example, in the range of 15 mg/L to 1000 mg/L or in the range of 15 mg/L to 500 mg/L. The maximum concentration of sulfate in the treated seawater may be specified in response to (based on) the particular application of the treated seawater. In some implementations, the maximum value of the concentration of sulfate specified for the treated seawater is in the range of 15 mg/L to 1000 mg/L.

At block 410, the method includes injecting the treated seawater into the subterranean formation. The injecting can be injecting the treated seawater through a wellbore of a well into an oil reservoir in the subterranean formation, thereby facilitating pressure maintenance of the oil reservoir. The injecting can be injecting the treated seawater through a wellbore of an injection well into an oil reservoir in the subterranean formation, thereby displacing crude oil in the oil reservoir through the subterranean formation toward a production well. The injecting may be injecting the treated seawater through a wellbore of a well into an oil reservoir in the subterranean formation, thereby both facilitating pressure maintenance of the oil reservoir and thereby displacing crude oil in the oil reservoir through the subterranean formation toward a production well. The injecting may include injecting the treated seawater through a wellbore of a well into the subterranean formation for enhanced oil recovery (EOR) (e.g., chemical flooding, polymer water flooding, etc.).

The injecting of the treated seawater may be injecting the treated seawater through a wellbore of a water well into an aquifer in the subterranean formation, thereby facilitating a squeeze treatment of the water well with a scale inhibitor. Thus, the injecting may involve injecting the treated seawater through the wellbore into the aquifer in the squeeze treatment of the water well with the scale inhibitor. If so, the method may include: (1) producing aquifer water from the aquifer through the wellbore of the water well to a surface conduit, wherein the aquifer water as produced has the scale inhibitor that was applied in the squeeze; (2) flowing the aquifer water as produced through the surface conduit to an injection well; and (3) injecting the aquifer water discharged from the surface conduit into an oil reservoir in a subterranean formation via the injection well, thereby facilitating pressure maintenance of the oil reservoir or thereby displacing crude oil in the oil reservoir toward a production well, or a combination thereof.

An embodiment is a method of providing seawater into a subterranean formation, including adding chloride salt having a metal cation to the seawater (having sulfate) to give a mixture, precipitating sulfate salt (of the metal cation and sulfate) in the mixture, removing the sulfate salt as precipitated from the mixture to give treated seawater having less sulfate than the seawater, and injecting the treated seawater into the subterranean formation. The injecting may include injecting the treated seawater through a wellbore of a well into an oil reservoir in the subterranean formation, thereby facilitating pressure maintenance of the oil reservoir. The injecting may include injecting the treated seawater through a wellbore of a well into an oil reservoir in the subterranean formation, thereby displacing crude oil in the oil reservoir through the subterranean formation toward a production well. The injecting may include injecting the treated seawater through a wellbore of a water well into an aquifer in the subterranean formation, thereby facilitating a squeeze treatment of the water well with a scale inhibitor. If so, the method may include producing aquifer water from the aquifer through the wellbore of the water well to a surface conduit (wherein the aquifer water as produced has the scale inhibitor), flowing the aquifer water as produced through the surface conduit to an injection well, and injecting the aquifer water discharged from the surface conduit into an oil reservoir in a subterranean formation via the injection well, thereby facilitating pressure maintenance of the oil reservoir or thereby displacing crude oil in the oil reservoir toward a production well, or a combination thereof.

The metal cation may be barium, calcium, or strontium, or any combinations thereof. The chloride salt may be barium chloride, calcium chloride, or strontium chloride, or any combinations thereof. The sulfate salt may be barium sulfate, calcium sulfate, or strontium sulfate, or any combinations thereof. The method may include specifying a maximum concentration of sulfate in the treated seawater, and selecting the chloride salt for adding to the seawater in response to the maximum concentration. In implementations, the seawater has at least 3000 mg/L of sulfate. In implementations, the maximum concentration of sulfate specified for the treated seawater is in a range of 15 mg/L to 1000 mg/L. The method may include specifying an amount of the chloride salt added in response to a maximum concentration of sulfate specified for the treated seawater, wherein adding the chloride salt includes adding the amount of the salt as specified to the seawater, wherein the metal cation includes barium ($Ba^{2+}$), calcium ($Ca^{2+}$), or strontium ($Sr^{2+}$), or any combinations thereof, and wherein the seawater has at least 2000 milligrams per liter (mg/L) of sulfate.

The adding of the chloride salt to the seawater may include adding two different chloride salts in sequence to the seawater. The two different chloride salts include a first chloride salt (having a first metal cation) and a second chloride salt (having a second metal cation different from the first metal cation) added after the first chloride salt. In implementations, the first metal cation is calcium ($Ca^{2+}$) or strontium ($Sr^{2+}$), or both, and the second metal cation is barium ($Ba^{2+}$). The adding of the chloride salt to the seawater may include adding a first chloride salt for a first time-period and adding a second chloride salt for a second time-period after the first time-period, wherein the second chloride salt is different from the first chloride salt. In implementations, the first chloride salt includes calcium chloride or strontium chloride, or both, and the second chloride salt includes barium chloride.

Another embodiment is method of providing seawater into a subterranean formation, including adding salt of a metal cation and chloride anion to seawater having sulfate (sulfate anions), thereby precipitating a sulfate compound having the metal cation and sulfate anion. The metal cation may be, for example, barium ($Ba^{2+}$), calcium ($Ca^{2+}$), or strontium ($Sr^{2+}$), or any combinations thereof. The seawater before addition of the salt may have at least 2000 mg/L of sulfate dissolved therein. The method includes separating the sulfate compound (e.g., barium sulfate, calcium sulfate, or strontium sulfate) as precipitated from the seawater to give treated seawater having a lower concentration of sulfate than the seawater and injecting the treated seawater into a subterranean formation. The injecting may include injecting the treated seawater through a wellbore of a well into the subterranean formation for enhanced oil recovery (EOR). The injecting may include injecting the treated seawater through a wellbore of a well into an oil reservoir in the subterranean formation, thereby facilitating pressure maintenance of the oil reservoir or thereby displacing crude oil in the oil reservoir through the subterranean formation toward a production well, or a combination thereof.

The method includes specifying a maximum concentration of sulfate in the treated seawater. The method may include specifying the salt added to the seawater (in response to the maximum concentration as specified), thereby maintaining concentration of sulfate in the treated seawater below the maximum concentration as specified. The method may include adjusting an amount of the salt added in response to the maximum concentration as specified. The method may include adjusting an amount time for the sulfate compound to precipitate in response to the maximum concentration of sulfate as specified, thereby maintaining concentration of sulfate in the treated seawater below the maximum concentration as specified. The salt added may include a first chloride salt and a second chloride salt different from the first chloride salt, wherein adding the salt includes adding the first chloride salt for a first time period and adding the second chloride salt for a second time period distinct from and after the first time period. In implementations, the metal cation of the first chloride salt is calcium ($Ca^{2+}$) or strontium ($Sr^{2+}$), and the metal cation of the second chloride salt is barium ($Ba^{2+}$). The method may include, in response to the maximum concentration as specified, changing the salt from a first chloride salt having a first metal cation to a second chloride salt comprising a second metal cation different from the first metal cation. In implementations, the first metal cation is calcium ($Ca^{2+}$) or strontium ($Sr^{2+}$), or both, and the second metal cation is barium ($Ba^{2+}$).

Yet another embodiment is a method of providing seawater into a subterranean formation, including adding salt having a metal cation to seawater having sulfate, thereby precipitating a sulfate salt of the metal cation and the sulfate. The salt added may be, for example, barium chloride, calcium chloride, or strontium chloride, or any combinations thereof. The method includes separating the sulfate salt (as precipitated) from the seawater to give treated seawater having a sulfate concentration less than a sulfate concentration of the seawater, and injecting the treated seawater into a subterranean formation. The injecting may include injecting the treated seawater through a wellbore of a well into the subterranean formation for enhanced oil recovery (EOR), or wherein injecting may include injecting the treated seawater through a wellbore of a water well into an aquifer in the subterranean formation in a squeeze treatment of the water well with a scale inhibitor. The method includes specifying a maximum value of the sulfate concentration of the treated seawater. The maximum value of the sulfate concentration specified for the treated seawater may be, for example, in a range of 15 mg/L to 1000 mg/L. The method may include specifying the salt added in response to the maximum value of the sulfate concentration specified for the treated seawater, wherein adding the salt includes adding the salt as specified to the seawater. In implementations, the sulfate concentration of the seawater is at least 2500 mg/L. In implementations, the seawater includes at least 3000 mg/L of sulfate. The sulfate concentration of the treated seawater may be less than 1000 mg/L.

The method may include specifying the salt and an amount of the salt added in response to the maximum value of the sulfate concentration specified for the treated seawater, thereby maintaining concentration of sulfate in the treated seawater below the maximum value as specified. The method may include adjusting an amount of the salt added in response to the maximum value of the sulfate concentration specified for the treated seawater, wherein the salt includes chloride salt of the metal cation and chloride. The metal cation may be, for example, calcium ($Ca^{2+}$), strontium ($Sr^{2+}$), or barium ($Ba^{2+}$), or any combinations thereof. The adding of the salt may include adding a first salt and a second salt after the first salt, wherein the metal cation of the first salt is calcium ($Ca^{2+}$) or strontium ($Sr^{2+}$), or both, and wherein the metal cation of the second salt is barium ($Ba^{2+}$).

EXAMPLE

This Example is given only as an example and not intended to limit the present techniques. Tests were conducted at ambient temperature (about 25° C.) with the synthetic seawater composition given in Table 4 having a sulfate concentration of 3476 mg/L. This synthetic seawater may resemble Arabian Gulf seawater. The synthetic seawater was prepared from fresh water. The synthetic water was prepared from fresh water with adding respective amounts of different salts to simulate the seawater in the laboratory. The prepared stock solution of the synthetic seawater was filtrated through a 0.45 micron (μm) filter paper to remove suspended solids. For the tests, chloride salts of divalent cations in the form of $BaCl_2 \cdot 2H_2O$, $SrCl_2 \cdot 6H_2O$, and $CaCl_2 \cdot 2H_2O$ were added (see Table 5) to the synthetic seawater after the initial removal of suspended solids.

TABLE 4

| Water composition used for tests | |
|---|---|
| (mg/L) | Synthetic seawater |
| Na | 17343 |
| K | 636 |
| Mg | 2056 |
| Ca | 617 |
| Sr | 13 |
| Cl | 30714 |
| HCO3 | 153 |
| SO4 | 3476 |

The test procedure for each test (Tests 1-8) included transferring 100 mL stock solution (synthetic seawater) into a test bottle, and adding pre-weighed chloride salt (barium chloride, strontium chloride, or calcium chloride) into the bottle (see Table 5).

TABLE 5

Salt type and amount used in the tests

| Test | Salt |
|---|---|
| #1 | 0.8 grams of $BaCl_2 \cdot 2H_2O$ at the beginning of test. |
| #2 | 1.1 grams of $BaCl_2 \cdot 2H_2O$ at the beginning of test. |
| #3 | 1.0 grams of $SrCl_2 \cdot 6H_2O$ at the beginning of test. |
| #4 | 1.2 grams of $SrCl_2 \cdot 6H_2O$ at the beginning of test. |
| #5 | 1.0 grams of $SrCl_2 \cdot 6H_2O$ at the beginning of test, then 0.2 grams of $BaCl_2 \cdot 2H_2O$ at 1-hour |
| #6 | 2.0 grams of $CaCl_2 \cdot 2H_2O$ at the beginning of test. |
| #7 | 4.0 grams of $CaCl_2 \cdot 2H_2O$ at the beginning of test. |
| #8 | 2.0 grams of $CaCl_2 \cdot 2H_2O$ at the beginning of test, then 0.2 grams of $BaCl_2 \cdot 2H_2O$ at 1-hour. |

The test bottle having the 100 mL stock solution and added chloride salt was placed into an incubator shaker for brief agitation. For comparison, the time at which the chloride salt is added is labeled as the beginning (start) of the test. For Tests 5 and 8, barium chloride was additionally added at 1 hour and the test bottle placed again into an incubator shaker for brief agitation.

An approximate 5 ml aliquot of test seawater was taken from test bottle after 1, 2, 4 and 24 hours, and filtrated (filtered) though 0.45 μm filter paper to remove solids. The test included to pipette 1 mL of the filtered solid-free sample into a test tube filled with 10 mL of quench solution. The quench solution was deionized water with 1000 part per million (ppm) by volume of scale inhibitor. The scale inhibitor was added to prevent any precipitation reactions occurring before and during analysis of the sample. The scale inhibitor added was a polyacrylate-based inhibitor. Other polymeric scale inhibitors (e.g. polymaleic, acrylic copolymer, etc.) and organic phosphates scale inhibitors (e.g., phosphonates) can also be used. Sulfate analysis on the collected sample of the combination of the 1 mL solid-free sample and 10 mL quench solution was performed. The measured sulfate concentrations (mg/L) by ion chromatography (IC) technique are listed as normalized for the 1 mL sample in Tables 6-8. For Test 5 and Test 8, are the results at 1 hour are before the $BaCl_2 \cdot 2H_2O$ was added.

TABLE 6

Sulfate concentrations (mg/L) from Tests #1 and #2.

| Time | Test #1 | Test #2 |
|---|---|---|
| Initial (0) | 3476 | 3476 |
| 1 | 288 | 33 |
| 2 | 281 | 23 |
| 4 | 275 | 15 |
| 24 | 258 | 12 |

TABLE 7

Sulfate concentrations (mg/L) from Tests #3, #4, and #5

| Time | Test #3 | Test #4 | Test #5 |
|---|---|---|---|
| Initial (0) | 3476 | 3476 | 3476 |
| 1 | 592 | 372 | 585 |

TABLE 7-continued

Sulfate concentrations (mg/L) from Tests #3, #4, and #5

| Time | Test #3 | Test #4 | Test #5 |
|---|---|---|---|
| 2 | 561 | 319 | 395 |
| 4 | 486 | 239 | 358 |
| 24 | 361 | 165 | 247 |

TABLE 8

Sulfate concentrations (mg/L) from Tests #6, #7 and #8.

| Time | Test #6 | Test #7 | Test #8 |
|---|---|---|---|
| Initial (0) | 3476 | 3476 | 3476 |
| 1 | 1935 | 911 | 1980 |
| 2 | 1466 | 867 | 1243 |
| 4 | 1449 | 838 | 990 |
| 24 | 1440 | 825 | 825 |

These results indicated that sulfate in seawater can be effectively removed embodiments of the present techniques. Utilizing barium salt may be very effective with sulfate concentration being reduced, for example, to below 20 mg/L, representing 90+% removal. Strontium salt and calcium salt are also effective sulfate removal to reduce sulfate in seawater. Most of the reaction (sulfate precipitation) occurred within the first hour after salt addition. As can be seen from the results, the amount of sulfate removed depends on the type of salt added and the amount of the salt added.

In commercial application in the field, depending on the availability and cost of the salts (chloride salts soluble in seawater), different salts can be added in sequence: For example, first add calcium salt or strontium salt, and then add barium salt. Salt can be added, for example, in powdery form (solid powder) or as concentrated solution in water. The salt (soluble in seawater) can be added to a vessel (mix vessel) (mixing vessel) having the seawater to be treated. In implementations, the resulting precipitation can be a controlled precipitation in that the amount of sulfate precipitated (for removal) can be controlled by type, amount, and sequence of the cations (salts) added. The concentration of final sulfate in the treated seawater can be controlled by adding different amounts of the soluble salts. The sulfate removal speed can be controlled by choosing different amounts of the chloride salt to add. For example, Test 2 can remove sulfate significantly quicker (faster) than Test 1.

The type (and sequence) of the soluble salts selected can depend on availability or cost of the chloride soluble salts soluble in seawater. The selection can depend on the material cost (requested quantity multiplied by unit cost) and availability of the soluble salts. The different individual salts or different mixtures of salts may give flexibility in selection decisions. The selection of the salt to add to the seawater can depend on the desired sulfate concertation in the treated seawater for the applications. If the desired sulfate concertation is less 100 mg/L, barium salt should generally be used. In implementations, if the desired sulfate concentration in the treated seawater is less than 500 mg/L, strontium salt may be applicable. If less than 1000 mg/L is desired or specified, calcium salt may be applicable. If were cost and availability are not factors, barium salt (barium chloride) may generally be applicable in most instances. Barium salt may generally be the most effective (yield lower sulfate residual concentration). There may be various criteria for selecting the type (and amount) of the soluble chloride salts and specifying any sequencing of more than one soluble salt.

The formed precipitates can be separated from the seawater before utilization of the treated seawater. For the separation, techniques can include medium filtration, bag filter, centrifugal separator, cyclone separator, gravitational sedimentation, and the like. The relatively high density of precipitated barium sulfate or strontium sulfate may be beneficial, for example, with centrifuge separation, cyclone separation, gravity separation, and the like. The density of barium sulfate or strontium sulfate are 4.50 g/cm$^3$ and 3.96 g/cm$^3$, respectively. This is significantly greater than the density of sand, clays, calcium sulfate, and limestone particles, which have density less than 3.0 g/cm$^3$.

Lastly, flocculant may generally not be implemented in the agglomerate precipitated sulfate particles (e.g., in the mix vessel). Separation techniques, such as centrifugal, separation, filter separation, and cyclonic separation may generally not benefit from agglomeration via a flocculant of the sulfate precipitate. Such may also be true for gravity separation. However, in implementations, a flocculant or flocculating agent may be implemented (e.g., added to the mix vessel in which the chloride salt is added to the seawater). The flocculant can be based on aluminum or polymeric acrylamide chemistry. The aluminum-based flocculant can be aluminum sulfate, aluminum chloride, sodium aluminate, aluminum chlorohydrate, and polyaluminum chloride. Acrylamide flocculant can be anionic, cationic, or amphoteric.

A number of implementations have been described. Nevertheless, it will be understood that various modifications may be made without departing from the spirit and scope of the disclosure.

What is claimed is:

1. A method of providing seawater into a subterranean formation, comprising:
    adding chloride salt to the seawater to give a mixture, wherein the seawater comprises sulfate, wherein adding the chloride salt comprises:
        adding a first chloride salt comprising a first metal cation during a first batch time;
        adding a second chloride salt comprising a second metal cation during a second batch time that is distinct from and after the first batch time;
        wherein the second metal cation is different than the first metal cation;
    precipitating sulfate salt in the mixture in a batch process having a total batch time that includes the first batch time and the second batch time, the sulfate salt comprising the first metal cation, the second metal cation, and sulfate, and wherein the sulfate salt is precipitated during the first batch time and the second batch time of the batch process before removing the sulfate salt as precipitated from the mixture;
    removing the sulfate salt as precipitated from the mixture to give treated seawater comprising less sulfate than the seawater; and
    injecting the treated seawater into the subterranean formation.

2. The method of claim 1, wherein the first metal cation comprises barium, calcium, or strontium, or any combinations thereof, and wherein injecting comprises injecting the treated seawater through a wellbore of a well into an oil reservoir in the subterranean formation, thereby facilitating pressure maintenance of the oil reservoir.

3. The method of claim 1, wherein the sulfate salt comprises barium sulfate, calcium sulfate, or strontium sulfate, or any combinations thereof, and wherein injecting comprises injecting the treated seawater through a wellbore of a well into an oil reservoir in the subterranean formation, thereby displacing crude oil in the oil reservoir through the subterranean formation toward a production well.

4. The method of claim 1, wherein injecting comprises injecting the treated seawater through a wellbore of a water well into an aquifer in the subterranean formation, thereby facilitating a squeeze treatment of the water well with a scale inhibitor.

5. The method of claim 4, comprising:
    producing aquifer water from the aquifer through the wellbore of the water well to a surface conduit, wherein the aquifer water as produced comprises the scale inhibitor;
    flowing the aquifer water as produced through the surface conduit to an injection well; and
    injecting the aquifer water discharged from the surface conduit into an oil reservoir in a subterranean formation via the injection well, thereby facilitating pressure maintenance of the oil reservoir or thereby displacing crude oil in the oil reservoir toward a production well, or a combination thereof.

6. The method of claim 1, wherein the first metal cation comprises calcium ($Ca^{2+}$) or strontium ($Sr^{2+}$), or both, and wherein the second metal cation comprises barium ($Ba^{2+}$).

7. The method of claim 1, comprising:
    specifying a maximum concentration of sulfate in the treated seawater; and
    selecting the chloride salt for adding to the seawater in response to the maximum concentration.

8. The method of claim 7, wherein the seawater comprises at least 3000 milligrams per liter (mg/L) of sulfate, wherein the first metal cation comprises barium chloride, calcium chloride, or strontium chloride, or any combinations thereof, and wherein the maximum concentration of sulfate specified for the treated seawater is in a range of 15 mg/L to 1000 mg/L.

9. The method of claim 1, comprising specifying an amount of the chloride salt added in response to a maximum concentration of sulfate specified for the treated seawater, wherein adding the chloride salt comprises adding the amount of the salt as specified to the seawater, wherein the first metal cation comprises barium ($Ba^{2+}$), calcium ($Ca^{2+}$), or strontium ($Sr^{2+}$), or any combinations thereof, and wherein the seawater comprises at least 2000 milligrams per liter (mg/L) of sulfate.

10. The method of claim 1, wherein the first chloride salt comprises calcium chloride or strontium chloride, or both, and wherein the second chloride salt comprises barium chloride.

11. A method of providing seawater into a subterranean formation, comprising:
    adding salt to seawater having sulfate comprising sulfate anions, thereby precipitating a sulfate compound, wherein adding the salt comprises:
        adding a first chloride salt comprising a first metal cation during a first batch time;
        adding a second chloride salt comprising a second metal cation during a second batch time that is distinct from and after the first batch time;
        wherein the second metal cation is different than the first metal cation;
        wherein adding the salt occurs in a batch process having a total batch time that includes the first batch time and the second batch time; and separating the sulfate compound as precipitated from the seawater to give treated seawater having a lower concentration of sulfate than the seawater, and wherein the sulfate compound is precipitated during the first batch time and the second batch time of the batch process before separating the sulfate salt from the seawater;

specifying a maximum concentration of sulfate in the treated seawater; and injecting the treated seawater into a subterranean formation.

12. The method of claim 11, wherein the first metal cation comprises barium ($Ba^{2+}$), calcium ($Ca^{2+}$), or strontium ($Sr^{2+}$), or any combinations thereof, wherein the sulfate compound comprises barium sulfate, calcium sulfate, or strontium sulfate, or any combinations thereof, and wherein injecting comprises injecting the treated seawater through a wellbore of a well into the subterranean formation for enhanced oil recovery (EOR).

13. The method of claim 11, wherein the first metal cation comprises calcium ($Ca^{2+}$) or strontium ($Sr^{2+}$), or both, and wherein the second metal cation comprises barium ($Ba^{2+}$), wherein the seawater comprises at least 2000 milligrams per liter (mg/L) of sulfate, wherein injecting comprises injecting the treated seawater through a wellbore of a well into an oil reservoir in the subterranean formation, thereby facilitating pressure maintenance of the oil reservoir or thereby displacing crude oil in the oil reservoir through the subterranean formation toward a production well, or a combination thereof.

14. The method of claim 11, comprising specifying the salt added to the seawater in response to the maximum concentration as specified, thereby maintaining concentration of sulfate in the treated seawater below the maximum concentration as specified.

15. The method of claim 11, comprising adjusting an amount of the salt added in response to the maximum concentration as specified.

16. The method of claim 11, wherein the first metal cation comprises calcium ($Ca^{2+}$) or strontium ($Sr^{2+}$), or both, and wherein the second metal cation comprises barium ($Ba^{2+}$).

17. The method of claim 11, comprising adjusting an amount of time for the sulfate compound to precipitate in response to the maximum concentration of sulfate as specified, thereby maintaining concentration of sulfate in the treated seawater below the maximum concentration as specified.

18. A method of providing seawater into a subterranean formation, comprising:

adding salt to seawater having sulfate, thereby precipitating a sulfate salt, wherein adding the salt comprises:
adding a first chloride salt comprising a first metal cation during a first batch time;
adding a second chloride salt comprising a second metal cation during a second batch time that is distinct from and after the first batch time;
wherein the second metal cation is different than the first metal cation; and
wherein adding the salt occurs in a batch process having a total batch time that includes the first batch time and the second batch time; and separating the sulfate salt from the seawater to give treated seawater comprising a sulfate concentration less than a sulfate concentration of the seawater, and wherein the sulfate compound is precipitated during the first batch time and the second batch time of the batch process before separating the sulfate salt from the seawater;

specifying a maximum value of the sulfate concentration of the treated seawater; and injecting the treated seawater into a subterranean formation.

19. The method of claim 18, wherein injecting comprises injecting the treated seawater through a wellbore of a well into the subterranean formation for enhanced oil recovery (EOR), or wherein injecting comprises injecting the treated seawater through a wellbore of a water well into an aquifer in the subterranean formation in a squeeze treatment of the water well with a scale inhibitor.

20. The method of claim 18, comprising specifying the salt added in response to the maximum value of the sulfate concentration specified for the treated seawater, wherein adding the salt comprises adding the salt as specified to the seawater, wherein the sulfate concentration of the seawater is at least 2500 mg/L, and wherein the sulfate concentration of the treated seawater is less than 1000 mg/L, and wherein the first metal cation comprises calcium ($Ca^{2+}$) or strontium ($Sr^{2+}$), or both, and wherein the second metal cation comprises barium ($Ba^{2+}$).

21. The method of claim 18, wherein the salt comprises barium chloride, calcium chloride, or strontium chloride, or any combinations thereof, wherein the seawater comprises at least 3000 milligrams per liter (mg/L) of sulfate, and wherein the maximum value of the sulfate concentration specified for the treated seawater is in a range of 15 milligrams per liter (mg/L) to 1000 mg/L.

22. The method of claim 18, comprising specifying the salt and an amount of the salt added in response to the maximum value of the sulfate concentration specified for the treated seawater, thereby maintaining concentration of sulfate in the treated seawater below the maximum value as specified.

23. The method of claim 18, comprising adjusting an amount of the salt added in response to the maximum value of the sulfate concentration specified for the treated seawater wherein the salt comprises chloride salt comprising the metal cation and chloride, and wherein the metal cation comprises calcium ($Ca^{2+}$), strontium ($Sr^{2+}$), or barium ($Ba^{2+}$), or any combinations thereof.

24. The method of claim 18, wherein adding the salt comprises adding a first salt and a second salt after the first salt, wherein the metal cation of the first salt comprises calcium ($Ca^{2+}$) or strontium ($Sr^{2+}$), or both, and wherein the metal cation of the second salt comprises barium ($Ba^{2+}$).

\* \* \* \* \*